May 12, 1970  J. R. PHLIPOT  3,511,266
SHUT OFF AND PRESSURE REGULATING VALVE
Filed March 13, 1967
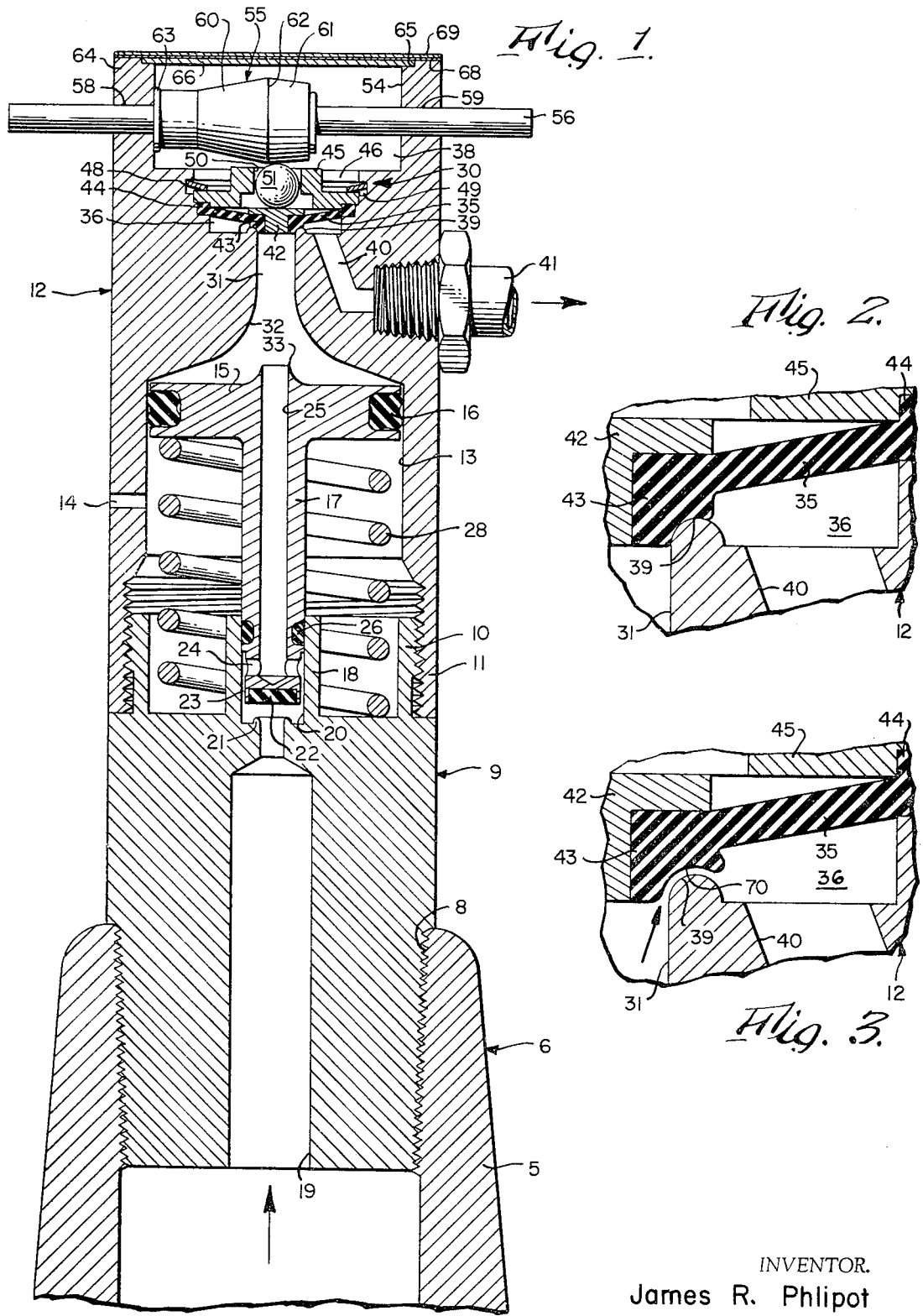
INVENTOR.
James R. Phlipot
BY
Popp and Sommer
ATTORNEYS

# United States Patent Office 3,511,266
Patented May 12, 1970

3,511,266
SHUT OFF AND PRESSURE REGULATING VALVE
James R. Phlipot, Hamburg, N.Y., assignor to The Firewel Company, Inc., Buffalo, N.Y., a corporation of Ohio
Filed Mar. 13, 1967, Ser. No. 622,729
Int. Cl. G05d 16/10; F16k 31/524
U.S. Cl. 137—484.4                           3 Claims

ABSTRACT OF THE DISCLOSURE

As to the shut off aspect, the valve has a diaphragm moved against a set around an inlet passage by a cam in line with this passage, as is known in the prior art, a feature of the invention being that this cam is mounted on a stem in turn mounted for axial sliding movement transversely of the line of movement of the diaphragm and with its ends projecting outwardly from opposite ends of the valve body to enable it to be pushed in opposite directions. The cam has two conical faces meeting at their large ends to provide a radially projecting edge and acting through a confined ball against the diaphragm, one being a working face and the other being a holding face to retain the valve in a closed position. In this closed position the portion of the diaphragm is sufficiently soft to permit blow-by in response to excessive inlet pressure. As to the pressure reducing aspect, the valve is of the known spring loaded piston and piston rod type with a passage through the piston and its rod rendered operative by a valve body at the end of the rod working in conjunction with a valve seat around an inlet passage, a feature of the invention being the provision of a venturi jet at the outlet end of the passage through the piston and its rod and discharging into a venturi throat, this tending to draw the piston to the open position of its valve body during final opening and closing movements to compensate for inlet pressure losses in the valve itself. The above novel features summarize the invention.

---

In the accompanying drawings, FIG. 1 is an enlarged vertical central section through a valve embodying the present invention and showing the same applied to the neck of a high pressure gas flask. FIG. 2 is a further enlarged fragmentary view similar to FIG. 1 showing a portion of the on-off section of the valve in its closed position. FIG. 3 is a view similar to FIG. 2 showing the manner in which the diaphragm permits blow-by when an excessive gas pressure develops within the flask.

The valve of the present invention is shown as applied to the neck 5 of a flask 6 containing a fluid, such as a gas, under a high pressure such, for example, as 5000 p.s.i.g., the valve reducing this to provide a much lower outlet pressure, such as 50–80 p.s.i.g.

The neck 5 is shown as being internally threaded as at 8 and into this neck is screwed a first valve body 9 having an upwardly projecting externally threaded sleeve 10 on which is screwed the internally threaded skirt 11 of a second valve body 12. This second valve body is formed to provide a cylindrical chamber 13 which is open at its bottom and which is vented to the atmosphere at 14. A piston 15 works in the cylindrical chamber 13, preferably being provided with a piston ring 16 of soft resilient plastic material and this piston 15 having a piston rod 17 which projects downwardly into and works in an inner cylindrical neck 18 which is integral with and projects upwardly from the first valve body member 9.

This first valve body member 9 is provided with an inlet passage 19 which at its lower end is open to the interior of the flask 6 and at its upper reduced end is open to the cylindrical space 20 within the upstanding inner cylindrical neck 18, this end of the passage 19 being surrounded by an annular valve seat 21 which projects upwardly into the chamber 20 and is adapted to be engaged by a soft resilient valve head 22 provided at the bottom end of the piston rod 17.

This bottom end of the piston rod 17 is of smaller diameter than the cylindrical chamber 20 so as to provide an annular space 23 through which the gas from the flask 6 can escape through a transverse passage 24 across the lower end of the piston rod 17 into an axial passage 25 therein, the upper end of which axial passage opens into the extreme upper end of the cylindrical chamber 13. A piston ring 26 of soft resilient plastic material is set into a groove in the lower end of the piston rod 17 above the annular space 23 and has sliding engagement with the walls of the cylindrical chamber 20 and functions to prevent the escape of fluid into the lower part of the cylindrical chamber 13 which, as previously described, is vented at 14 so that such loss would be a waste to the atmosphere. It will be seen that the sealing means 16, 26 around the piston 15 and portion of its rod 17 working in the bore 20, isolate the portion of the cylinder 13 between these two sealing means to ambient. The piston 15 is yieldingly held in an elevated position in which its valve head 22 is open or spaced from the valve seat 21 by means of a helical compression spring 28 seated at its bottom on the first valve body 9 and at its top against the underside of the piston 15.

The second valve body 12 houses a manually operated on-off valve 30 having an inlet passage 31 leading coaxially from the top of the cylindrical chamber 13.

A feature of the invention is that the inlet end of this inlet passage 31 is in the form of a venturi throat 32 having its large lower end opening into the top of the cylindrical chamber 13 and contracting or diminishing in cross section toward its upper end. The upper outlet end of the passage 25 through the piston 15 and its stem 17 is in the form of a venturi nozzle 33 directed coaxially toward the venturi throat 32.

The inlet passage 31 opens at its upper end into a chamber divided by a horizontal diaphragm 35 into a valve chamber 36 and a cam chamber 38, the wall of the valve chamber 36 opposite the diaphragm 35 being provided with a raised annular valve seat 39 surrounding the inlet passage 31. The second valve body 12 is provided with an outlet passage 40 leading from the valve chamber 36 and which is in communication with the inlet passage 31 only when the diaphragm 35 is unseated from the valve seat 39. The outlet passage 40 can be connected to the apparatus being served by a line 41.

The diaphragm 35 is made of flexible distortable organic plastic material and has secured thereto a rigid head 42 which is in line with but does not engage the valve seat 39, this valve seat being engaged by an annular portion 43 of the diaphragm which is sufficiently soft and resilient to permit blow-by, as illustrated in FIG. 3, when excessive pressures develop in inlet passage 31.

The rim 44 of the diaphragm 35 is held in sealed engagement with the interior of the valve body 12 by means of a ring 45 set into a counterbore 46 in the second valve body 12 and which forms part of the cam chamber 38. This compressive sealing engagement between the ring 45 and rim 44 of the diaphragm 35 can be maintained in any suitable manner as by a snap ring 48 set into a groove 49 around the counterbore 46 and engaging the top of the ring 45 around its periphery.

A feature of the invention resides in the provision of a coaxial bore 50 through the center of the ring 45 in line with the inlet passage 31. In this bore is seated a metal ball 51, the fit being sufficiently close so that the ball is maintained generally in central relation to the valve head 42 on which it rests, but the fit not being so snug as to prevent air passage past the ball. The upper part of the sum chamber 38 is of enlarged form as indicated at 54, and houses a cam 55 which is operable from the exterior of the valve body 12 and, through the ball 51, serves to move the diaphragm 35 into seated engagement with the valve seat 39. This cam 55 is mounted on a stem 56 which is slidingly mounted in horizontal coaxial slideways 58 and 59 so that its ends project outwardly from opposite sides of the second valve body 12. These slideways 58 and 59 are arranged so that the center of the stem 56 is in line with the inlet passage 31 and valve seat 39 and so that the stem moves transversely of the line of movement of the diaphragm 35.

Within the cam chamber 38 the stem carries a cam having two conical surfaces 60 and 61 joined at their larger ends to provide a radially outwardly projecting edge 62. These surfaces move with the stem 56 and the projecting edge 62 is movable to opposite sides of the crest of the ball 51. The conical surface 60 is a working surface which serves to move the ball 51 downwardly so as to force the portion 43 of the diaphragm 35 into sealed engagement with the valve seat 39 as illustrated in FIGS. 1 and 2. The conical surface 61 is a holding surface which engages the crest of the ball 51 immediately following the complete closure of the on-off valve 30 and serves to prevent retrograde accidental movement of the valve stem 56. For this purpose, just after the crest of the ball 51 has passed from the working surface 60 over the radially projecting edge 62 onto the holding surfaces 61, the stop end 63 of the cam 55 engages with the corresponding side of the upper part 54 of the cam chamber 38.

Desirably the top rim 64 of the cam chamber 38 is open and provided with an internal annular groove 65 into which is set a metal disk 66. This disk is held in position by the adhesive layer 68 on the underside of decalcomania label 69, the rim of which is adhesively secured by the adhesive 68 to the top of the valve body rim 64 and which can bear identification data, such as the manufacturer's name, part number and serial number assigned to the valve, performance data etc.

OPERATION

Assuming gas at 5000 p.s.i.g. pressure in the flask 6 with a desired reduced pressure at 50 p.s.i.g. in the outlet line 41, and that the manual off-on valve 30 is closed, and no gage pressure in the outlet line 41, the operator first pushes on the left hand end of the valve stem 56 so as to move the double cone cam valve 55 to the right from the position shown. In so doing the crest of the ball 51 leaves the holding face 61 and passes over the outwardly protruding annular edge 62 which separates this holding face 61 from the working face 62 along which the valve ball 51 moves. The preponderating pressure against the underside of the diaphragm 35 moves this diaphragm and the ball 51 upwardly, the ball riding along the diminishing diameter working conical cam face 60 toward the axis of the valve stem 56. Accordingly gas under pressure is free to escape from the inlet passage 31 over the valve seat 39 through the valve chamber 36 into the outlet line 41.

With the pressure reducing valve section open at this time and its valve head 22 raised out of contact with the valve seat 21, gas under pressure from the flask flows via passage 19, cylindrical chamber 20, annular space 23, cross passages 24, axial passage 25, top of cylindrical chamber 13, venturi throat 32, passage 31, valve chamber 36, outlet passage 40 and outlet line 41. As the outlet pressure in the outlet line 41 and inlet passage 31 to the shut off valve 30 rises toward the assumed 50 p.s.i.g., the rising pressure on top of the piston 15 lowers this piston and when the assumed 50 p.s.i.g. is reached the valve head 22 is brought into contact with the valve seat 21 so that the flow of gas from the flask 6 is cut off. When the outlet pressure in 41, and hence above the piston 15, thereafter drops below 50 p.s.i.g. the piston 15 raises and unseats the valve head 22 from the raised valve seat 21. Accordingly gas under flask pressure again flows from the flask 6, inlet passage 19, cylindrical chamber 20, annular space 23 around bottom valve step 17, transverse passages 24, axial passage 25 and through venturi nozzle 33 into venturi throat 32 and hence through passage 31, valve chamber 36 and outlet passage 40 into the outlet 41. In issuing from venturi nozzle 33 into the venturi throat 32 the jet of high pressure gas tends to reduce the pressure on the top area of the piston 15 surrounding the venturi nozzle 33. Accordingly this venturi effect tends to draw the piston in the direction to hold its valve head 22 open, this effect increasing as the piston 15 raises to bring the venturi nozzle 33 into closer relation to the venturi throat 32. Accordingly the pressure reducing valve tends to compensate for the internal pressure losses or pressure drop in the valve itself. When the outlet pressure reaches the assumed 50 p.s.i.g. pressure this is reflected against the top of the piston, notwithstanding the venturi nozzle 33, and the piston moves downwardly against the resistance of its spring 28 until it brings its valve head 22 against the raised valve seat 21 again to a closed position for repetition of the cycle when the demand in the outlet line 41 drops below the assumed 50 p.s.i.g. pressure.

To manually shut off the valve, the operator pushes on the right hand end of the step 56 so as to cause the then enlarging working surface 60 of the double cone cam valve 55 to push down on the crest of the ball 51 which, through the lead 42, moves the diaphragm 35 downwardly until its thick or fleshy part 43 engages with the raised valve seat 39 as shown in FIGS. 1 and 2. On so pushing the stem 56 to its extremity the crest of the ball 51 passes beyond the outwardly protruding edge 62 and onto the holding face 61. As soon as the crest of the ball is in reliable engagement with this holding face the end 63 of the cam 55 engages the inner face of the top chamber 54 of the cam chamber 38 and hence the holding face 61, through the ball 51, maintains the diaphragm 35 seated against the valve seat 39 so that the entire valve is manually closed regardless of any demand existing in the outlet line 41 and the apparatus being served.

If, however, the gas pressure in the passage 31 should for any reason, as by leakage past 22, rise to excessive value, the manual shut off valve 30 will permit blow-by until the pressure in passage 31 is reduced to the safe value, such as the assumed 50 p.s.i.g. Under these conditions the pressure reducing valve section in the first valve body 9 is open and hence this excessive flask pressure is in the inlet passage 31 of the manual shut off valve 30 and impressed against the thick or fleshy part 43 of the shut off valve disk 35. This valve disk is made of an organic plastic which is flexible and sufficiently soft and distortable, having a value of, say, 60 durometers, so that the fleshy part 43 will yield and distort under such excessive flask pressure and provide an escape passage 70 through which gas under the excessive pressure can escape, as illustrated in FIG. 3, past the manual shut off valve 30 from the inlet passage 31 via the valve chamber 36 into the outlet passage 40 and outlet line 41.

I claim:
1. A valve having a body with a chamber divided by a diaphragm means into a valve chamber and a cam chamber, the wall of said valve chamber opposite said diaphragm means being provided with a valve seat engageable with said diaphragm and surrounding an inlet passage, the valve body being provided with an outlet passage leading from said valve chamber and being in communication with said inlet passage only when said diaphragm means is unseated from said valve seat, wherein the improvement comprises cam means operable from the exterior of the body and including a stem mounted in said body for axial sliding movement across said cam chamber transversely of the line of movement of said diaphragm means toward said valve seat, a cam on said stem and having a salient cam face protruding toward said diaphragm means and seat, means interposed between said cam face and diaphragm means for moving said diaphragm means toward engagement with said valve seat in response to axial movement of said stem in a corresponding direction and comprising a ball engaged at one side by said cam face and at its opposite side by said diaphragm means, and means retaining said ball in line with said valve seat, said cam having a pair of conical faces with their enlarged parts joined to provide a radially projecting edge adapted to pass to opposite sides of the center plane of the ball whereby one of said conical faces provides a working face for moving said diaphragm means into engagement with said seat and the other conical face provides a holding face holding said diaphragm means in engagement with said seat.

2. Valve as set forth in claim 1 wherein the opposite ends of said stem protrude from opposite sides of said valve body whereby the opposite protruding ends so render said cam means operable from the exterior of the body.

3. A valve having a body with a chamber divided by a flexible, distortable organic plastic diaphragm into a valve chamber and a cam chamber, the wall of said valve chamber opposite said diaphragm being provided with a valve seat engageable with said diaphragm and surrounding an inlet passage, the valve body being provided with an outlet passage leading from said valve chamber and in communication with said inlet passage only when said diaphragm is unseated from said valve seat, wherein the improvement comprises a head of rigid material attached to said diaphragm in line with said seat and cam means in said cam chamber and operable from the exterior of said body to move said head toward said valve seat to press and seal an interposed part of said diaphragm compressively against said valve seat, the thickness and resiliency of said interposed part of said diaphragm permitting spreading of said interposed part of said diaphragm away from said valve seat thereby permitting blow-by in response to excessive pressure in said inlet passage even with said diaphragm held against said valve seat by said cam means.

References Cited

UNITED STATES PATENTS

| 2,211,167 | 8/1940 | Safford | 251—331 XR |
| 2,368,852 | 2/1945 | Lauck | 251—251 XR |
| 2,646,070 | 7/1953 | Holland | 251—262 XR |
| 2,753,887 | 7/1956 | Meincke | 137—505.25 |
| 2,856,148 | 10/1958 | Heathcote et al. | 251—331 XR |
| 2,923,315 | 2/1960 | Bletcher et al. | 251—251 |
| 3,053,499 | 9/1962 | Jones | 251—331 XR |
| 3,196,901 | 7/1965 | Phillips | 137—505.25 XR |

FOREIGN PATENTS

| 76,105 | 4/1919 | Austria. |
| 240,943 | 1/1960 | Australia. |
| 510,040 | 2/1955 | Canada. |
| 578,803 | 3/1924 | France. |
| 1,108,998 | 6/1961 | Germany. |
| 1,310,411 | 1/1962 | France. |

M. CARY NELSON, Primary Examiner

R. J. MILLER, Assistant Examiner

U.S. Cl. X.R.

137—505.25; 251—251

PO-1050
(5/69)

UNITED STATES PATENT OFFICE
CERTIFICATE OF CORRECTION

Patent No. 3,511,266        Dated        May 12, 1970

Inventor(s) James R. Phlipot

It is certified that error appears in the above-identified patent and that said Letters Patent are hereby corrected as shown below:

Column 3, line 2, change "sum" to --cam--.

Column 4, line 30, change "lead" to --head--.

Column 5, line 27, change "wth" to --with--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents